UNITED STATES PATENT OFFICE.

OTTO SCHMIDT, OF MANNHEIM, GERMANY, ASSIGNOR TO BADISCHE ANILIN & SODA FABRIK, OF LUDWIGSHAFEN-ON-THE-RHINE, GERMANY, A CORPORATION OF GERMANY.

AZO DYE.

936,951.  Specification of Letters Patent.  Patented Oct. 12, 1909.

No Drawing.  Application filed May 22, 1909.  Serial No. 497,753.

*To all whom it may concern:*

Be it known that I, OTTO SCHMIDT, doctor of philosophy and chemist, subject of the King of Prussia, residing at Mannheim, Germany, have invented new and useful Improvements in Azo Dye, of which the following is a specification.

I have discovered that benzoyl-para-phenylene-diamin-mono-sulfonic acid compounds which can be obtained by treating para-phenylene-diamin-monosulfonic acid with benzoyl chlorid, or a substitution product thereof and which possess a constitution probably corresponding to the formula

in which X represents the benzoyl, or substituted benzoyl, residue, upon being diazotized and combined with 1.3-naphthol-sulfonic acid, or with 1.3.6-naphthol-disulfonic acid, or 2.3.6-naphthol-disulfonic acid, or with 1.3.6.8-naphthol-trisulfonic acid, give rise to coloring matters which are eminently suitable for use in the form of their lakes. As instances of substituted benzoyl compounds which can be used in the preparation of the benzoyl-para-phenylene-diamin-monosulfonic acid compounds which are employed according to my invention, I mention the ortho-, meta-, and para-nitrobenzoyl chlorids and the chlorbenzoyl chlorids.

My new coloring matters produced according to this invention are, in the form of their sodium salts, soluble in water, in the form of their lakes they possess from Bordeaux-red to violet-red shades and are extremely fast against the action of light; on reduction with tin and hydrochloric acid they give rise on the one hand to an amino-naphthol-sulfonic acid, and on the other hand to a benzoyl-para-phenylene-diamin-monosulfonic acid compound. The new coloring matter which I desire to be understood as claiming specifically is that obtainable by combining diazotized orthochlor-benzoyl-para-phenylene-diamin-monosulfonic acid with 2.3.6-naphthol-disulfonic acid. In the form of its lakes it possesses a Bordeaux-red color and on reduction with tin and hydrochloric acid gives rise to 1.2-amino-naphthol-3.6-disulfonic acid and ortho-chlor-benzoyl-para-phenylene-diamin-monosulfonic acid.

The following example will serve to illustrate further the nature of my invention and how it can be performed, but the invention is not confined to this example. The parts are by weight. Dissolve thirty-one and two-fifths parts of the sodium salt of benzoyl-para-phenylene-diamin sulfonic acid and seven parts of sodium nitrite in one thousand parts of water, and allow this solution to run, while stirring, into a mixture of seven hundred and fifty parts of ice and thirty parts of thirty-two per cent. hydrochloric acid. Stir for one hour, then filter off the diazo compound which has separated out, and introduce it into a solution of thirty-four and four-fifths parts of the di-sodium salt of 1.3.6-naphthol-disulfonic acid, to which sufficient sodium carbonate has been added to maintain the whole alkaline. When, from a test portion, no diazo compound is found to be present, neutralize the mixture with acetic acid, heat to from seventy to seventy-five degrees centigrade, and precipitate the coloring matter by means of common salt. In a similar manner, instead of benzoyl-para-phenylene-diamin-sulfonic acid, its derivatives which are substituted in the benzoyl ring, can be employed, and instead of 1.3.6-naphthol-disulfonic acid, any one of the other aforementioned naphthol-sulfonic acids can be used, and the corresponding coloring matters be obtained.

Now what I claim is:—

1. The azo coloring matters obtainable by combining a diazotized benzoyl-para-phenylene-diamin-monosulfonic acid compound with a naphthol-sulfonic acid, in which position 3' is substituted by a sulfonic acid group, which coloring matters are, in the form of their sodium salts, soluble in water, in the form of their lakes possess from Bordeaux-red to violet-red shades which are extremely fast against the action of light, on reduction with tin and hydrochloric acid give rise on the one hand to an amino-naphthol-sulfonic acid and on the other hand to a benzoyl-para-phenylene-diamin-monosulfonic acid compound.

2. The azo coloring matter obtainable by combining diazotized ortho-chlor-benzoyl-para-phenylene-diamin-monosulfonic acid with 2.3.6-naphthol-disulfonic acid, which coloring matter, in the form of its sodium salt, is soluble in water, and in the form of its lakes possesses a Bordeaux-red color and on reduction with tin and hydrochloric acid gives rise to 1.2-amino-naphthol-3.6-disulfonic acid and ortho-chlor-benzoyl-paraphenylene-diamin-monosulfonic acid.

In testimony whereof I have hereunto set my hand in the presence of two subscribing witnesses.

OTTO SCHMIDT.

Witnesses:
   J. ALEC. LLOYD,
   S. H. SHANK.